United States Patent [19]

Wilson et al.

[11] Patent Number: 4,570,230
[45] Date of Patent: Feb. 11, 1986

[54] METHOD OF MEASURING AND CONTROLLING THE LEVEL OF LIQUID IN A CONTAINER

[75] Inventors: James H. Wilson, Export; John F. Laycak, West Mifflin, both of Pa.

[73] Assignee: United States Steel Corporation, Pittsburgh, Pa.

[21] Appl. No.: 479,398

[22] Filed: Mar. 28, 1983

[51] Int. Cl.$^4$ .................. G05B 15/02; G01F 23/24; B22C 19/04
[52] U.S. Cl. .................. 364/477; 73/295; 164/449; 364/509; 364/557
[58] Field of Search .......... 364/509, 557, 477, 468; 73/295, 292, 291; 164/449, 155, 456, 156

[56] References Cited

U.S. PATENT DOCUMENTS

| | | | |
|---|---|---|---|
| 3,204,460 | 9/1965 | Milnes | 73/295 |
| 3,300,820 | 1/1967 | Tiskus et al. | 164/449 |
| 3,399,568 | 9/1968 | Wilson | 73/295 |
| 3,797,310 | 3/1974 | Babcock | 73/295 |
| 3,864,973 | 2/1975 | Petry | 164/449 |
| 3,921,697 | 11/1975 | Petry | 164/449 |
| 3,946,795 | 3/1976 | Bruderer et al. | 164/449 |
| 4,066,114 | 1/1978 | Dorr et al. | 73/295 |
| 4,126,041 | 11/1978 | Doi et al. | 73/295 |
| 4,306,610 | 12/1981 | Ahmed | 164/155 |
| 4,425,795 | 1/1984 | Albrecht et al. | 73/295 |
| 4,449,404 | 5/1984 | Böhme et al. | 73/295 |
| 4,466,282 | 8/1984 | Kühnel | 73/295 |

FOREIGN PATENT DOCUMENTS 57-66319  4/1982  Japan .................. 73/295

*Primary Examiner*—Felix D. Gruber
*Attorney, Agent, or Firm*—William F. Riesmeyer, III

[57] ABSTRACT

A method is provided for measuring and controlling the level of an elevated temperature liquid in a container. The electrical voltage signal outputs of a plurality of temperature sensing devices at spaced elevations on the container are converted to digital form. The converted signals are periodically scanned in elevation sequence. A determination is made from the scanned signals of the location of the uppermost sensing means having a converted signal value of sufficient magnitude to indicate a temperature in the wall below the level of liquid in the container. Then a fraction, F, of the spacing between the sensing means, n, and the next above sensing means, $n-1$, is calculated as a function of the converted signal value, $Sn-1$. The measured level in the container is calculated as a function of, n, and, F, with respect to their location on the container. Finally, the rate of addition and withdrawal of liquid to and from the container is controlled based on the measured liquid level in the container.

6 Claims, 6 Drawing Figures

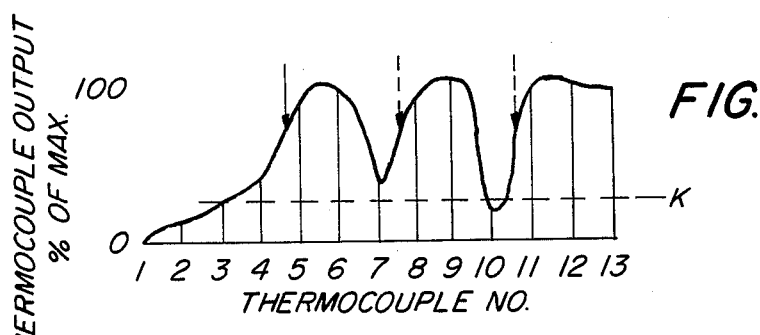
FIG. 1
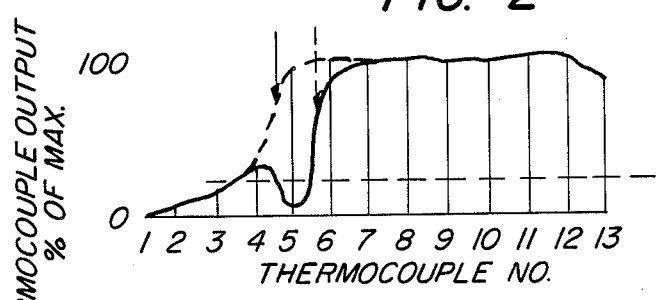
FIG. 2
FIG. 3
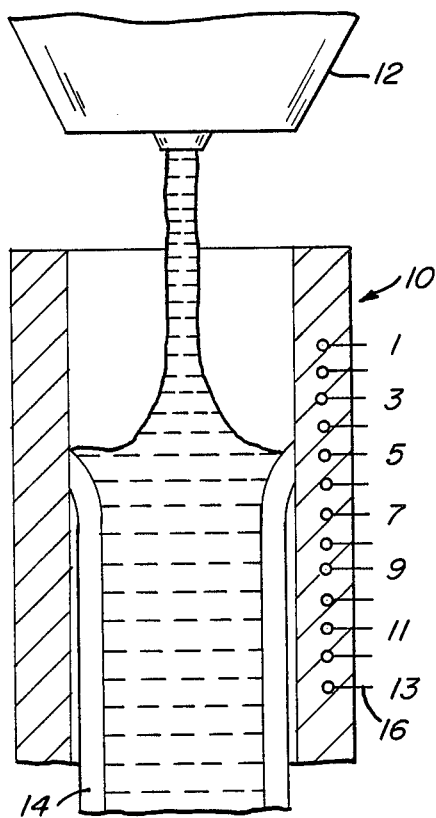
FIG. 4
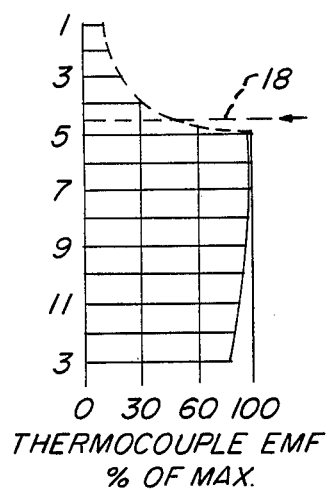

METHOD OF MEASURING AND CONTROLLING THE LEVEL OF LIQUID IN A CONTAINER

BACKGROUND OF THE INVENTION

The present invention relates to a method of measuring and controlling the level of an elevated temperature liquid in a container, and particularly to a method of measuring and controlling the level of molten metal in a vessel, for example, a mold in a continuous casting machine.

A system commonly used to measure the level of molten steel in a continuous caster mold utilizes a plurality of thermocouple probes located at spaced elevations on the mold wall. The probes provide electrical voltage signal outputs corresponding to the thermal profile along the mold wall due to the liquid steel in the mold. The conventional apparatus for determining the liquid level from the probe output signals is disclosed in U.S. Pat. No. 3,204,460, Milnes and U.S. Pat. No. 3,399,566, Wilson. The recorder balance slide-wire has worked adequately for many years. But recent changes in casting practices and more stringent process control requirements have established the need for changes in the equipment. Variation in the casting flux and flux buildup on the mold walls as well as submerged tube pouring have increased problems of determining the steel level in the mold. In addition, false level indications sometimes occur due to sudden mold level and casting speed variations. Perhaps the most common problems are false recorder oscillation and sluggish response due to improper amplifier gain adjustments. However, serious consequences may result from the problems of poor probe contact or shorted probes resulting in lower than normal or zero voltage signal outputs. The effect of these factors is indicated in FIGS. 1 and 2, respectively, where false levels are indicated (dotted arrows) instead of the true level (solid arrow).

It is the primary object of this invention to overcome the aforementioned difficulties associated with conventional thermoprobe liquid level measurement systems.

SUMMARY OF THE INVENTION

The method of the present invention includes converting to digital form the electrical voltage signal outputs of a plurality of temperature sensing means located at spaced elevations on the wall of a container above and below the level of elevated temperature liquid therein. The converted signals are periodically scanned in elevation sequence, preferably in a direction from the top to the bottom of the container. Then from the scanned converted signals a determination is made of the location, n, of the uppermost sensing means having a converted signal value, $Sn$, of sufficient magnitude corresponding to a temperature indicating the sensing means lies below the level of liquid in the container. Preferably, this step includes selecting as reference signals those converted signals greater than a predetermined threshold signal value, K, corresponding to thermal radiation of the liquid material entering the container and to extraneous electrical noise. Then the uppermost pair of adjacent sensing means is found which have reference signals greater than, K, and in which the upper sensing means in the pair has a converted signal value of at least about seventy percent (70%) of the value of the lower sensing means in the pair. The upper sensing means in the pair is designated, n, i.e. the uppermost sensing means lying below the liquid level. A fraction, F, of the spacing between sensing means, n, and the next above sensing means, n−1, is calculated as a function of the converted signal value, $Sn-1$, of sensing means, n−1. Preferably, F, is determined by the relation, $$F = \frac{Sn - Sn - 1}{Sn},$$

corresponding to the slope of the profile of converted signal values at Sn and Sn−1. The measured level is then calculated as a function of n and F with respect to their location on the container. This may be done preferably by a relation, $$L = [(n-1) + F](SF) + PD$$

where SF is the spacing distance between sensing means and PD is the distance of the first or highest sensing means from the top of the container. Finally, the rate of addition and withdrawal of liquid to and from the container is controlled based on the measured liquid level. Preferably, this includes control of ladle and/or tundish flow rates, for example, through step or continuous positioning of slide-gate valves.

BRIEF DESCRIPTION OF THE DRAWINGS

FIG. 1 is an electrical voltage signal profile indicating poor contact at thermocouple positions 7 and 10.

FIG. 2 is an electrical voltage signal profile indicating a shorted out thermocouple at position 5.

FIG. 3 is a schematic representation of a continuous casting mold having thermocouple probes located at spaced elevations along the mold wall.

FIG. 4 is an electrical voltage signal profile corresponding to the mold and thermocouple devices of FIG. 3.

DESCRIPTION OF THE PREFERRED EMBODIMENT

Figure 5:
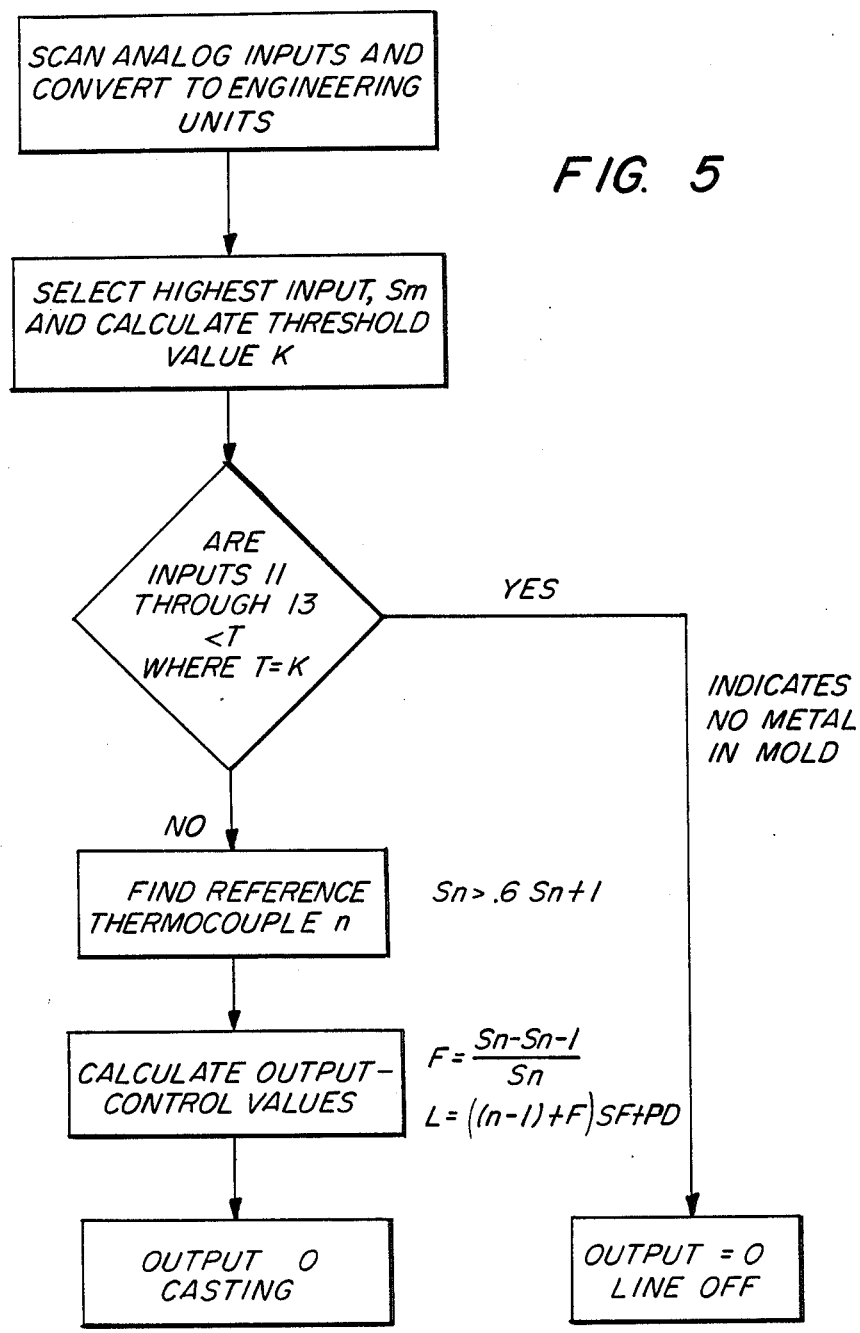
FIG. 5 is a flow chart illustrating the calculations performed in the preferred embodiment of this invention to determine the measured liquid level.

FIG. 3 is a schematic illustration of a continuous casting mold 10 to which molten steel is added from a tundish 12. The mold is internally cooled so as to withdraw heat from the molten metal causing solidification of a solid outer shell 14 which exits from the bottom of the mold. A plurality of thermoprobes 16, preferably of the type disclosed in U.S. Pat. No. 3,797,310, Babcock and Wilson, are provided at spaced elevations in the mold wall for producing electrical signal outputs in response to thermal gradients along the mold due to the liquid. The probes in this example are spaced one-inch (1″) apart (designated hereafter as PD), but may be any spacing desired for a particular application. The uppermost probe is located a distance (SP) 3.5 inches from the top of the mold. Again this distance may vary depending on the application. FIG. 4 shows a typical profile of the electrical signal of the probes and the location of the actual molten metal level 18 with respect to the profile.

The millivolt values of the output signals for the various probes are converted to digital form and stored in a microprocessor (see FIG. 5). A threshold value, K=CM is calculated as a predetermined proportion, C, of the signal having the highest converted value, M. The proportion is selected by experience so that, K, will correspond to the level of thermal radiation of the molten metal stream entering the mold and to extraneous electrical noise. The value of the constant, C, will normally be within a range of 0.2/0.5, usually about 0.25. Thus, K, is selected so as to drop out converted signals from probes 1, 2 and 3 in FIG. 4 which are affected by thermal radiation from the stream entering the mold and also by electrical noise.

The converted signals are periodically scanned in elevation sequence preferably in the direction from the top to the bottom of the mold. This scan is made for the purpose of determining the location of the first probe, n, below the level of liquid in the mold, i.e. the first probe on the upper portion of the profile. In FIG. 4, probe number 5 is the probe fitting this description. This probe is located by comparing the converted values of each probe having a reference signal greater than, K, with the corresponding value of its next adjacent probe in elevation sequence in the mold. It will be apparent from the profile shown in FIG. 4 that this probe can be located by determining the uppermost pair of probes having converted values differing less than about ± thirty percent (30%) from each other. Or, stated another way, the upper probe must be at least seventy percent (70%) of the signal value of the lower one in the pair. The first probe below the metal level is then the upper one of the probes in this pair. Thus, probes on the steep slope portion of the profile curve in FIG. 4 are eliminated by the condition imposed for selection of the relevant pair of adjacent probes. Also, probes lying adjacent to probes making poor contact, as in FIG. 1, are generally eliminated due to the sequential scanning in the method of this invention and the limitation of finding the uppermost pair of probes fitting the imposed conditions.

The level of molten metal in the mold is then determined to lie somewhere within the range of levels represented by the uppermost probe in the pair found to fit the conditions just mentioned and the next adjacent probe thereabove. A fraction of the spacing between the probes, n, and the next above probe, n−1, is calculated as a function of the signal value, Sn−1. Preferably, this fraction, F, is found by the relation $$F = \frac{Sn - Sn - 1}{Sn}.$$

From the fraction, F, and the location of probe, n, the level of the metal, L, as measured from the top of the mold downwardly, may be determined by:

$$L=[(n-1)+F](SF)+PD$$

where SF is the spacing distance between probes and PD is the distance of the first or highest probe from the top of the mold.

Figure 6:
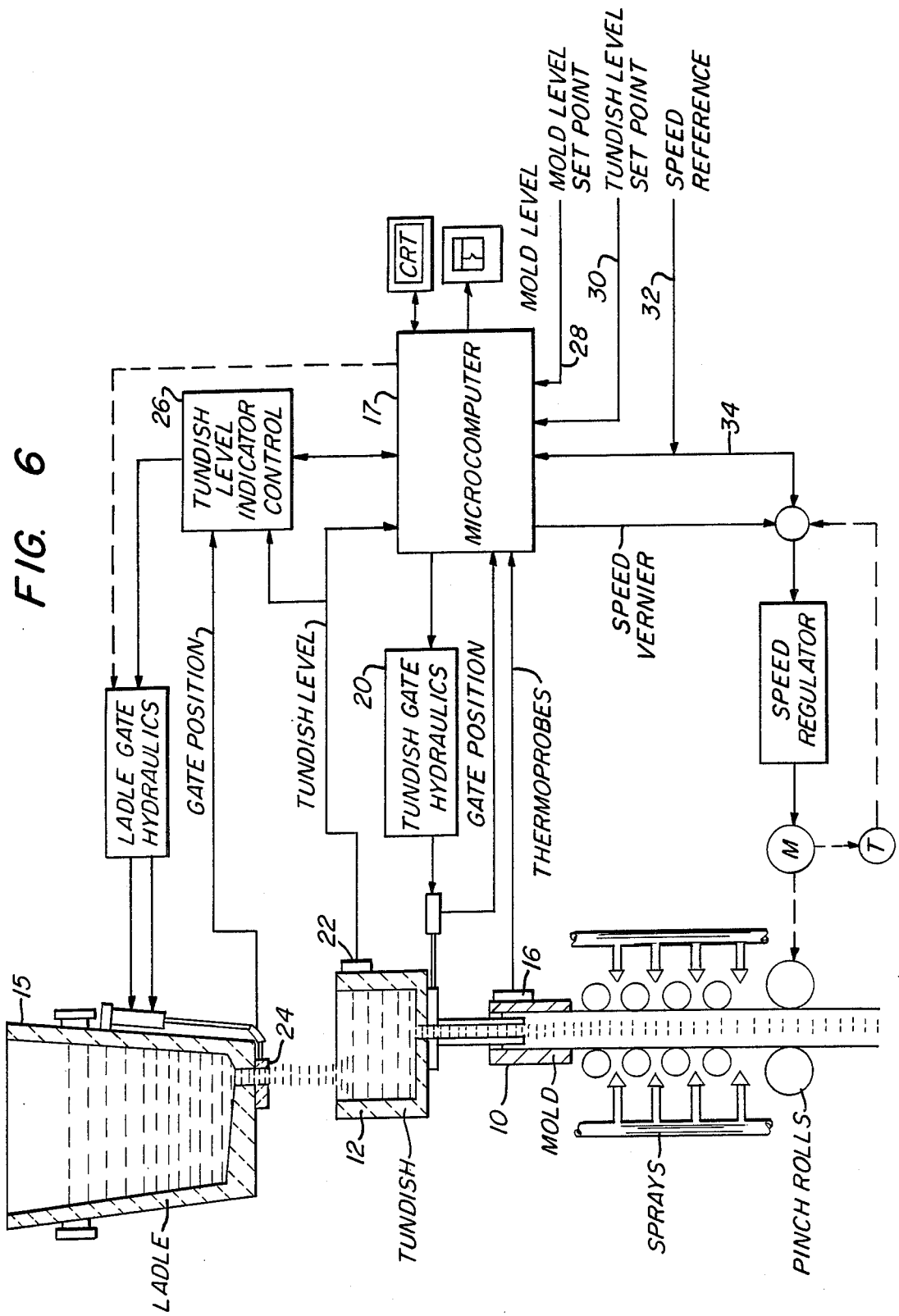
FIG. 6 is a schematic illustration of the preferred flow and speed control system of the method of this invention.

Various means of controlling the liquid level may be used based on the level measurement just described. For example, the method of U.S. Pat. No. 3,300,820, Tiskus and Wilson, may be used, the specification of which is incorporated herein by reference. FIG. 6 shows a preferred system for regulating the flow rate of steel into the mold which is another invention made by Wilson and Mazur and which will be the subject of another application commonly assigned with the present one. In this method it is desired to regulate the casting speed only when the mold level exceeds a preset limit. A measure of the liquid level in the mold is obtained by the digital method just described. An error signal is developed as the difference in a voltage proportional to the measured level and a voltage proportional to the desired (setpoint) level. The error signal has a polarity deviation indicating the direction of deviation of the measured level from that desired and a magnitude proportional to the magnitude of deviation between the two. If the measured level is determined to be within predetermined limits, the system continues in a flow regulation mode, maintaining constant casting speed. In this mode a flow-control algorithm is used to calculate an output based on the sums of the proportional, integral and derivative functions of the error signed over time and a value that is proportional to the reciprocal of square root of the change in tundish height. This combined control signal is used to regulate flow rate by changing the position of a slide gate valve on the tundish. The slide gate valve is positioned by a hydraulic cylinder which is controlled by either a hydraulic servo valve or a pulse train which steps the cylinder to various positions.

If the mold-level error signal is greater than the deadband limits, the system begins to regulate casting speed while maintaining the tundish slide-gate device in its last position. An alarm signals the operator that speed control is now in operation. The system will not return to the flow control mode until the operator resets the flow control system based upon his clearing the apparent problem in this system. The system, preferably, also has the capability of controlling tundish level by a hydraulic ladle-gate system and suitable tundish level measurement. An example of the latter is the Studsvik EMLI system.

FIG. 6 shows the mold 10, tundish 12 and ladle 15. The mold is fitted with a plurality of thermoprobes 16 providing electrical voltage signal inputs to microcomputer 17. In addition, the computer receives input of the actual gate position, if available, from the tundish slide-gate control 20 and the tundish level measurement device 22. Similarly, the computer receives input for the actual gate position, if available, from ladle slide gate control 24 through the tundish level indicator control 26. Various desired setpoints are fed manually, namely a mold level setpoint 28, tundish level setpoint 30 and speed reference 32. Actual speed 34 is also fed to the computer. These signals are used to control the liquid level in the mold based on the calculated measured level and the various setpoints for the system. In the event control of the level cannot be attained by movement of the ladle and tundish gates speed control is initiated to maintain the proper level.

We claim:

1. A method of measuring and controlling the level of an elevated temperature liquid in a container, said method comprising:

converting to digital form the electrical voltage signal outputs of a plurality of temperature sensing means located at spaced elevations on a wall of said container above and below the expected level of liquid therein, said electrical signal outputs being indicative of the temperature profile along said wall due to the presence of liquid in the container;

periodically scanning the converted signals of the temperature sensing means in sequence with respect to the location of said sensing means on the wall of the container;

after converting the signal outputs to digital form, selecting as reference signals those converted signals greater than a predetermined threshold signal value K corresponding to thermal radiation of the liquid material entering the container and to extraneous electrical noise;

determining the uppermost sensing means below the liquid level in the container by locating the uppermost pair of adjacent sensing means having reference signals greater than K and in which the upper sensing means of said pair has a converted signal value at least greater than seventy percent (70%) of the converted signal value of the lower sensing means in said pair, the upper sensing means in said pair being designated as n and the converted signal value of said upper sensing means being designated as $S_n$;

calculating a fraction F of the spacing between the sensing means n and the next above sensing means $n-1$ at which the liquid level is estimated to lie, said fraction being a function of the converted signal value $S_{n-1}$ of the sensing means $n-1$;

calculating the location of the measured liquid level in the container from n and F; and controlling addition and withdrawal of liquid to and from the container based on said measured liquid level.

2. The method of claim 1 wherein the step of periodically scanning the converted signals of the temperature sensing means includes scanning in sequence in a direction from the top to the bottom of the container.

3. The method of claim 1 wherein the step of determining the uppermost sensing means below the liquid level in the container includes located the uppermost pair of adjacent sensing means having reference signals greater than K and in which the upper sensing means of said pair has a converted signal value at least greater than eighty percent (80%) of the converted signal value of the lower sensing means in said pair.

4. The method of claim 1 wherein the step of selecting reference signals includes determining the maximum converted signal $S_{mi}$ on each scan and calculating $K = CS_{mi}$ based thereon, wherein C is a constant dependent on the level of thermal radiation from a stream of liquid entering the container and electrical noise.

5. The method of claim 4 wherein C has a value within the range of 0.2 to 0.5.

6. The method of claim 1 wherein F is determined by the relation $F = (S_n - S_{n-1})/S_n$.

* * * * *